United States Patent [19]

Bussiere et al.

[11] 4,291,105

[45] Sep. 22, 1981

[54] BIMETALLIC STRIP FOR LOW TEMPERATURE USE

[75] Inventors: Jean F. Bussiere, Yaphank; David O. Welch, Poquott; Masaki Suenaga, Bellport, all of N.Y.

[73] Assignee: The United States of America as represented by the United States Department of Energy, Washington, D.C.

[21] Appl. No.: 64,595

[22] Filed: Aug. 7, 1979

[51] Int. Cl.³ .............................................. B32B 15/04
[52] U.S. Cl. .................................... 428/616; 428/662
[58] Field of Search ................................ 428/616–619, 428/628, 641, 642, 662, 930; 156/656, 666; 73/363.5

[56] References Cited

U.S. PATENT DOCUMENTS

| | | | |
|---|---|---|---|
| 3,262,187 | 7/1966 | Allen et al. | 428/662 |
| 3,309,179 | 3/1967 | Fairbanks | 428/662 |
| 3,325,888 | 6/1967 | Weinig et al. | 428/662 |
| 3,432,280 | 3/1969 | Llewelyn et al. | 428/641 |

Primary Examiner—Michael L. Lewis

Attorney, Agent, or Firm—Leonard Belkin; Dean E. Carlson; James E. Denny

[57] ABSTRACT

There is provided a class of mechanically pre-stressed structures, suitably bi-layer strips comprising a layer of group 5 transition metals in intimate contact with a layer of an intermetallic compound of said transition metals with certain group 3A, 4A or 5A metals or metalloids suitably gallium, indium, silicon, germanium, tin, arsenic or antimony. The changes of Young's modulus of these bi-layered combinations at temperatures in the region of but somewhat above absolute zero provides a useful means of sensing temperature changes. Such bi-metallic strips may be used as control strips in thermostats, in direct dial reading instruments, or the like. The structures are made by preparing a sandwich of a group 5B transition metal strip between the substantially thicker strips of an alloy between copper and a predetermined group 3A, 4A or 5A metal or metalloid, holding the three layers of the sandwich in intimate contact heating the same, cooling the same and removing the copper alloy and then removing one of the two thus formed interlayer alloys between said transition metal and the metal previously alloyed with copper.

4 Claims, 4 Drawing Figures

TEMPERATURE DEPENDENCE OF YOUNG'S MODULUS OF $Nb_3Sn$
(x = SAMPLE 1, ∘ = SAMPLE 2)

– – – SOUND VELOCITY DATA NORMALIZED AT 300 K

——— VOIGT-REUSS-HILL AVERAGE OF SINGLE-CRYSTAL DATA $E_{Nb_3Sn}(300K) = 13.7 \times 10^{11}$ DYNE $cm^{-2}$

BIMETALLIC STRIP FOR LOW TEMPERATURE USE

The invention described herein was made or conceived in the course of, or under a contract with, the United States Department of Energy.

BACKGROUND OF THE INVENTION

1. Field of the Invention

The present invention relates to the effect of changes in Young's modulus with temperature, and in particular, the effect of temperature on Young's modulus of $Nb/Nb_3Sn$ bi-metallic strips.

2. Discussion of the Relevant Art

The use of bi-metallic strips as temperature sensing devices has been known in the temperature measuring art for many years. Most of these bi-layered strips depend for their operation upon the change in the radius of curvature of the strips during temperature changes by virtue of a difference in the coefficient of expansion of the two components, usually two metals of said strips. Heretofore, it has not been known to utilize temperature dependent changes in the Young's modulus of one of the components of the bi-layer strip for temperature sensing purposes.

Certain transition metal/metal or metalloid alloy bi-layer combinations have been used during low temperature work as super conducting materials, principally by virtue of the super-conducting qualities of the crystals of the transition metal/metal or metalloid alloy. Of a particular interest in this group of compounds have been niobium stannide layers, in particular, niobium stannide on niobium layers.

These super-conductive materials are usually either layered on other materials, for example, on copper, steel or aluminum as disclosed in U.S. Pat. No. 3,537,827 to Benz or have been coated upon other materials such as a barium ferrite slurry as disclosed in U.S. Pat. No. 3,534,459 to Kudo et al.

There have been studies of Young's modulus of niobium stannide both as single crystals, (Keller and Hanak: Phys. Rev. 154,628; 1967) and as polycrystals (Testardi, Physical Acoustics, Mason & Thurston Eds. Vol. X, p193 and Vol. XIII p29, 1977 Academic Press, New York). On the basis of the temperature dependence of the elastic moduli revealed by the single crystal work, applicants herein believed that the polycrystal work, carried out by ultrasonic measurement, was not representative of the true variation with temperature of the Young's modulus of niobium stannide in the temperature range 4-300 K. Applicants herein noted that niobium stannide and niobium have substantially identical coefficients of thermal expansion. Therefore, since Young's modulus of niobium itself is well known, they determined to study Young's modulus of niobium stannide by preparing an internally stressed bimetallic composite of a niobium stannide layer upon niobium film, and thus determine the variation with temperature of Young's modulus of niobium stannide from temperature dependent changes in the radius of curvature of the bimetallic strip.

SUMMARY OF THE INVENTION

It has been determined that certain bi-layered structures comprising a first metal layer of a transition metal of group 5B, suitably vanadium or niobium in intimate contact with a second layer of an intermetallic compound between said first transition metal and a metal or metalloid selected from groups 3A, 4A, or 5A, suitably gallium, indium, silicon, germanium, tin, arsenic or antimony yields a bi-layered structure showing substantial changes in Young's modulus at temperatures in the region of or somewhat above absolute zero. The changes in Young's modulus of the intermetallic compounds give rise to substantial changes in the radius of curvature of the bi-layered structure if it is prepared so as to contain an internal mechanical prostress. The changes are particularly remarkable in the region of 20° K. to 100° K., although the present invention is not limited to use in that range. The bi-layer strips of this type may be utilized in temperature sensors, such as thermostatic control devices or direct dial reading thermometers.

The structures of the present invention, in order to be operative, must be mechanically prestressed. This prestressing may be achieved in the following manner:

A sandwich is prepared wherein the middle layer is a strip of the group 5B transition metal. The upper and lower layers of the sandwich are layers of a copper alloy with the predetermined metal or metalloid of group 3A, 4A or 5A, mentioned hereinabove. The sandwich is suitably prepared by depositing, by casting, sputtering, or other suitable means, the copper alloy around a central plate of the transition metal. The composite plate is then rolled to the desired thickness and cut into strips. The strips are heated to predetermined temperature for a predetermined time. After heating, the sandwich is allowed to cool, during which stage the prestressing occurs. The prestress arises because of thermal stresses due to differential thermal contraction between the copper alloy and the layers of transition metal and intermetallic compound. Provided the copper alloy is of sufficient thickness, the thermal stress suffices to produce plastic deformation in the ductile transition metal, but not in the brittle intermetallic compound. This plastic deformation results in the desired prestress in the transition metal/metal or metalloid intermetallic compound plus transition metal composite even when the copper alloy has been removed. Therefore, the copper alloy layers in this strip should be at least about twice the thickness of the middle transition metal layer.

The copper alloy strips are removed suitably by acid etching utilizing an acid, which will remove the copper alloy, but will not affect the intermetallic compound between the transition metal and the metal previously alloyed, nor will it affect the residual prestress between the intermetallic compound and the transition metal which originated with the plastic deformation of the transition metal.

One of the thus produced intermetallic compound layers is then removed also suitably by etching to provide the desired structure comprising the transition metal strip with the transition metal/metal or metalloid intermetallic compound layer.

It should be noted that while the above procedures resemble those for making superconductors it is not the superconducting properties which are of interest in the subject invention. Rather, it is the plastic deformation of only the transition metal layer which imparts the desired prestress. Thus, as the structure cools the more rapidly contracting copper alloy layers apply stress to the transition metal layers and to the layers of intermetallic compound formed during the heating. This stress lies essentially in the plane of the layers and is sufficient to cause plastic deformation of the transition metal layer, but not of the intermetallic compound layers. Thus, when the copper alloy layers and one of the intermetallic layers are removed, the remaining intermetallic layer will expand in the plane while the deformed transition metal layer will not, causing the structure to assume the curved shape. The radius of this curvature will change with temperature and the structure formed as described above can be used as a temperature sensor, as will be described fully below.

BRIEF DESCRIPTION OF THE DRAWINGS

In order that the invention may be more fully understood, it will now be described by way of example, with reference to the accompanying drawings, in which.

DESCRIPTION OF THE PREFERRED EMBODIMENT

Figure 2:
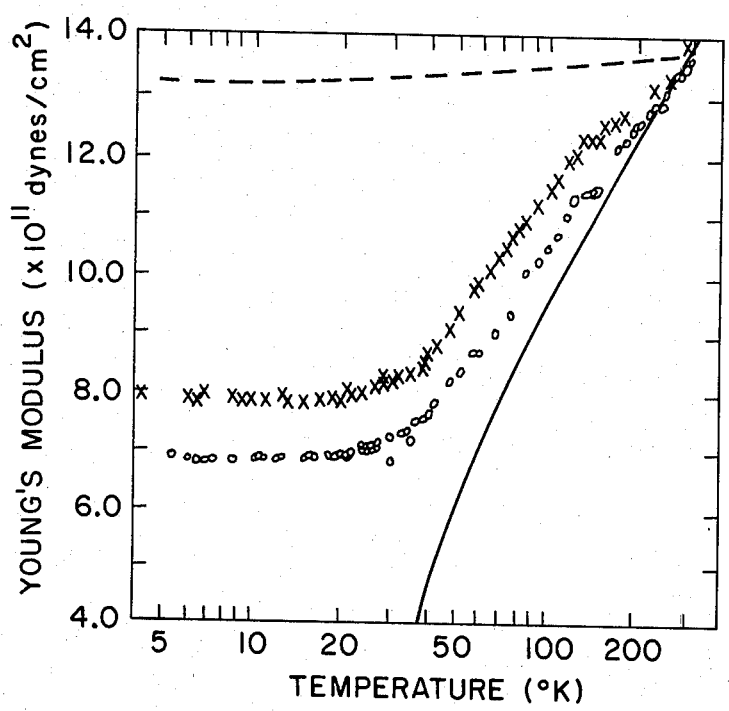
FIG. 2 is a graph showing Young's modulus of niobium stannide as measured by two experiments carried out in accordance with the present invention and two experiments from the literature.
Figure 1A:
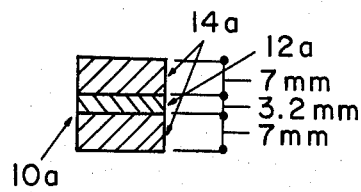
FIG. 1A shows a cross section of the bi-metallic structure of the present invention before rolling.
Figure 1B:
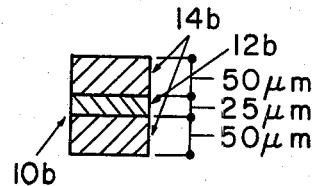
FIG. 1B shows a cross section of the bi-metallic structure after rolling.

Referring to FIGS. 1A and 1B the structures of the present invention are prepared utilizing a transition metal strip, suitably a niobium or vanadium plate 12a. In the preferred procedure, there is prepared a plate 12a of the transition metal, suitably a plate of thickness of about 2 to about 5 millimeters. There is cast around plate 12a, a bronze 14a of desired composition. Bronze 14a is an alloy of copper with a metal or metalloid of groups 3A, 4A, or 5A, suitably gallium, indium, silicon, germanium, tin, arsenic or antimony. The composition of bronze 14a comprises between ten and twenty per cent by weight of the aforesaid metal or metalloid. The thickness of the bronze 14a is not critical, provided that it is at least twice the thickness of plate 12a, preferably four times the thickness of the transition metal segment. Composite plate 10a is then rolled, in a conventional manner, to a thickness of approximately 125 microns ($\mu$m) wherein a central layer 12b of thickness about 25 $\mu$m is surrounded by two layers of approximately 50 $\mu$m of bronze 14b. In the desired procedure composite plate 10a is then slit into strips 10b and heated at a temperature of between 600° C. to about 850° C. for from about 600 hours to about 30 minutes. This procedure is an intermetallic compound layer (not shown) of the order of about 3 to 5 $\mu$m in thickness at the interlayer between plate 10b and bronze 14b.

Bronze 14b is then removed suitably by acid etching, most suitably by etching with dilute nitric acid.

One of the intermetallic layers (not shown) is then removed by further etching. One surface of strip 10b is coated with an acid resistant lacquer and strip 10b immersed in an etching medium. The etching medium utilized is suitably a mixture of nitric acid and hydrofluoric acid, preferably diluted with water. A suitable mixture comprises between two and four parts by weight of concentrated nitric acid, between zero and three parts by weight of water and between one and two parts by weight of hydrofluoric acid. This composition removes the intermetallic compound faster than the metal itself. The resulting composition automatically curls with the plate 12b on the inside.

The strip 10b can then be utilized for the desired temperature sensing procedures by means known to the art.

EXAMPLE:

Preparation of niobium stannide/niobium strips

Referring again to FIGS. 1A and 1B a plate 12a of pure niobium (3.2 mm×40 mm×100 mm) is provided and copper/tin bronze 14a (87:13 w/w) is cast around plate 12a to a thickness of at least 7 millimeters on each side. The composite plate 10a is then rolled to a total thickness of about 125 $\mu$m to provide a plate having about 50 $\mu$m of bronze 14b on each side and 25 $\mu$m of niobium 12b in the middle. The plate 10a is then slit into 12 mm by 50 mm strips 10b and heated at 725° C. for 50 hours. Strips 10b are cooled to room temperature and immersed in dilute nitric acid (0.1 N) to remove the bronze 14b. One side of niobium 12b is coated with Microstrip Lacquer, such as that manufactured by Michigan Chrome and Chemical Co., Detroit, Mich., and immersed in a solution of hydrofluoric acid in nitric acid (NHO$_3$ (Conc.)/HF./H$_2$O-4:2:1), washed to remove the acid, immersed in acetone to remove the lacquer, and then utilized as desired.

In accordance with the above procedure, but utilizing vanadium in place of niobium, and gallium, silicon or germanium bronze in place of tin/copper bronze, there are obtained bi-layer strips of vanadium gallide, vanadium silicide, and vanadium germanide on vanadium respectively.

Figure 3:
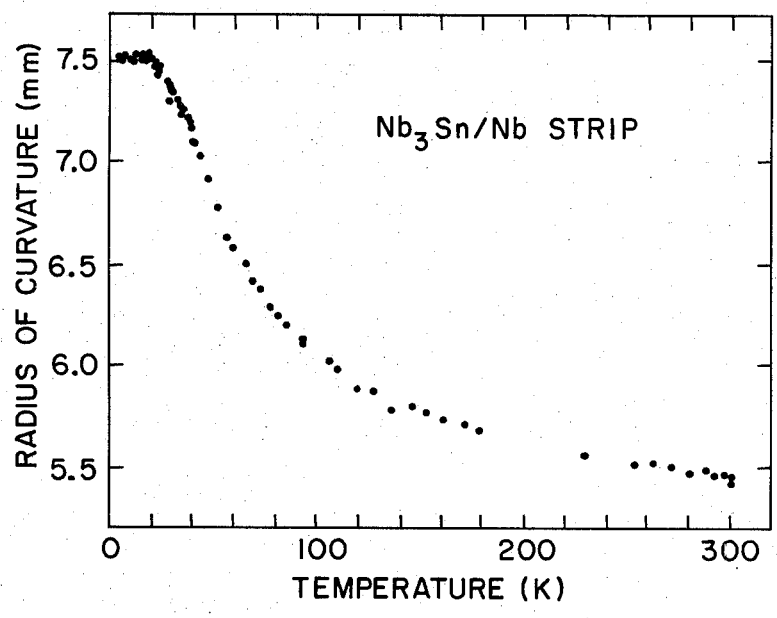
FIG. 3 is a graph showing the temperature dependence of the radius of curvature of a niobium/niobium stannide strip prepared in accordance with the example given in the specification.

As can be seen from the data of FIG. 3 the radius of curvature of the resulting strips decrease sharply with increasing temperature in the range from 20° K. to 100° K.

Young's modulus of the intermetallic compound may be determined from the following equation:

$$\frac{E_1'}{E_1} = \frac{RE_o'}{R'E_o} \cdot \frac{2}{a} \{1 + [1 - 4k^{-2}a^{-2}L^2(R/R')^2]^{\frac{1}{2}}\}^{-1}$$

where:

$$L = \frac{l_1}{l_o} \quad k = \frac{E_o l_o (1 - \nu_1)}{E_1 l_1 (1 - \nu_o)}$$

wherein

E is Young's modulus,

R is the radius of curvature and a is an expression set forth below:

$$a + k^{-2}[(1+k)(L^2+k) + 3k(1+L)^2 - k(R/R')(R+6-L+4L^2)]$$

and $\nu$ is Poisson's ratio, l is the layer thickness, and the subscripts one and zero refer to Nb$_3$Sn and Nb, respectively.

Having thus set forth the nature of the invention, what is claimed is:

1. A bi-layer structure consisting essentially of:

(a) a first layer of a group 5B transition metal; and, (b) a second layer consisting essentially of an intermetallic compound between the metal of said first layer, and a metal or metalloid selected from the group consisting of gallium, indium, silicon, germanium, tin, arsenic or antimony, said second layer having been bonded to said first layer to form said bi-layer structure, said structure defining a plane, and said structure having been subjected to compressive stresses essentially in the plane of said structure, said stresses having been chosen to cause plastic deformation of said first layer without causing such deformation of said second layer, whereby said structure assumes a curved shape upon removal of said compressive stresses.

2. A structure of claim 1 wherein the transition metal is niobium and the intermetallic compound is niobium stannide.

3. A structure in accordance with claim 1 wherein the transition metal is vanadium and the intermetallic compound is vanadium gallide, vanadium silicide, or vanadium germanide.

4. A temperature sensor comprising a bi-layer structure of claim 1 in combination with sensing means for responding to temperature caused variations in the radius of curvature of said bi-layer structure.

* * * * *